United States Patent [19]

Sakaue et al.

[11] Patent Number: 5,547,498

[45] Date of Patent: Aug. 20, 1996

[54] EASILY DISPERSIBLE COLORING CARBON BLACK AND PROCESS FOR PREPARING AN INK

[75] Inventors: Akinori Sakaue; Nobutake Mise; Makoto Ishizu, all of Kitakyushu, Japan

[73] Assignee: Mitsubishi Chemical Corporation, Tokyo, Japan

[21] Appl. No.: 442,152

[22] Filed: May 16, 1995

Related U.S. Application Data

[62] Division of Ser. No. 296,155, Aug. 29, 1994, which is a continuation of Ser. No. 940,786, Sep. 4, 1992, abandoned, which is a continuation of Ser. No. 803,905, Dec. 9, 1991, abandoned, which is a continuation of Ser. No. 440,112, Nov. 22, 1989, abandoned.

[30] Foreign Application Priority Data

Nov. 25, 1988 [JP] Japan ................... 63-297421

[51] Int. Cl.⁶ .................................................. C09D 11/00
[52] U.S. Cl. ..................... 106/20 C; 106/20 R; 106/472
[58] Field of Search ..................... 106/20 R, 20 C, 106/23 R, 472

[56] References Cited

U.S. PATENT DOCUMENTS

| Re. 19,750 | 11/1935 | Billings et al. | 23/314 |
|---|---|---|---|
| 2,384,236 | 9/1945 | Carlton | 23/314 |
| 3,498,814 | 3/1970 | Voet et al. | 106/477 |
| 3,565,659 | 2/1971 | Dickerson | 106/477 |
| 3,775,344 | 9/1971 | Amagi et al. | 423/445 |
| 4,061,719 | 12/1977 | Schallus et al. | 423/449 |
| 4,158,682 | 6/1979 | Price et al. | 264/40.4 |
| 4,164,423 | 8/1979 | Schumacher et al. | 106/20 R |
| 4,435,377 | 3/1984 | Rothbuhr | 423/449 |
| 4,518,434 | 5/1985 | Wilder | 423/445 |
| 4,569,834 | 2/1986 | West et al. | 423/460 |
| 4,608,244 | 8/1986 | Sugihara et al. | 423/445 |

FOREIGN PATENT DOCUMENTS

| 360236 | 9/1989 | European Pat. Off. |
| 1807714 | 2/1971 | Germany. |
| 729381 | 5/1955 | United Kingdom. |

OTHER PUBLICATIONS

"Carbon Blacks for Specialty Applications", pub. by Cabot Corp., Waltham, Mass., Jun. 1988.
Japanese Industrial Standard JIS K 6221, "Testing Methods Of Carbon Black For Rubber Industry", 3 pages, 1982 (no month available).
"Typical Properties Of Performance Carbon Blacks", Company brochure by Columbian, 2 pages, Oct. 1991.
"Special Carbon Blacks For Color–Conductivity–UV Protection", Company brochure by Cabot, 4 pages (no date available).
"Dispersing With The Laboratory Dissolver DISPERMAT", Company brochure by VMA–Getzmann GmbH, 14 pages (no date available).
"1977 Consumption Of Carbon Black In Printing Inks By 50 Leading Ink Manufactures By Supplier By Grade", study by Stategic Analysis Inc., 2 pages (no date).
Verdichtungsmashinen Vacupress–Walzwerke, delivery references by Babcock–BSH AG, Machines For Powder Densification, pp. 1–15 (no date available).

Primary Examiner—Helene Klemanski
Attorney, Agent, or Firm—Oblon, Spivak, McClelland, Maier, & Neustadt, P.C.

[57] ABSTRACT

Easily dispersible coloring carbon black obtained by compacting carbon black powder material to have a bulk density of from 0.10 to 0.50 g/cm³ and having an initial dispersion of at most 5.0%.

9 Claims, 1 Drawing Sheet

EASILY DISPERSIBLE COLORING CARBON BLACK AND PROCESS FOR PREPARING AN INK

This is a division of application Ser. No. 08/296,155, filed on Aug. 29, 1994, pending, which is a continuation of application Ser. No. 07/940,786, abandoned, filed on Sep. 4, 1992, which is a continuation of application Ser. No. 07/803,905, filed Dec. 9, 1991, abandoned, which is a continuation of application Ser. No. 07/440,112, filed Nov. 22, 1989, abandoned.

BACKGROUND OF THE INVENTION

1. Field of the Invention

The present invention relates to novel carbon black for an ink and a process for efficiently producing an ink by using such carbon black.

2. Description of the Background

In a carbon black manufacturing plant, it is common to pelletize produced carbon black to facilitate its storage and transportation and also for the purpose of preventing scattering of fine powder during the use by end users. However, in its application to an ink, the dispersibility becomes most important in view of a problem that in the process for preparing an ink, it is impossible to knead carbon black by a strong kneader as used for the preparation of rubber or for incorporating a coloring agent to a resin. Therefore, for the preparation of an ink, carbon black in a powder form having a low bulk density and good dispersibility has been used without pelletizing.

Because of the importance placed on the dispersibility for the preparation of an ink, carbon black used to be packaged in a paper bag in the form of powder without pelletizing. Therefore, a large amount of bulky and easily scattering carbon black had to be unpackaged for the preparation of an ink, which created serious problems from the operational and environmental viewpoint.

SUMMARY OF THE INVENTION

The present inventors have conducted extensive studies to solve the above problems. As a result, they have found it possible to obtain carbon black free from such problems by compacting carbon black powder material to obtain compacted flake pellets having a bulk density of from 0.10 to 0.50 g/cm$^3$ and a initial dispersion of at most 5.0%. Namely, the bulk density is increased by the compacting, whereby such problems as scattering or operational difficulties have been solved, and at the same time, it has been found unexpectedly that the dispersibility to a vehicle is not impaired. Further, by using such pellets, it has been made possible to substantially shorten the time for dispersing carbon black to a vehicle and to attain substantial merits for the preparation of carbon black including reducing dirty and dusty operation, shortening of the operation for charging carbon black and minimizing the capacity for storage.

BRIEF DESCRIPTION OF THE DRAWINGS

Then single FIGURE illustrates a vertical cross-sectional view of a twin roll compacting machine of the present invention.

DETAILED DESCRIPTION OF THE PREFERRED EMBODIMENTS

Figure 1:
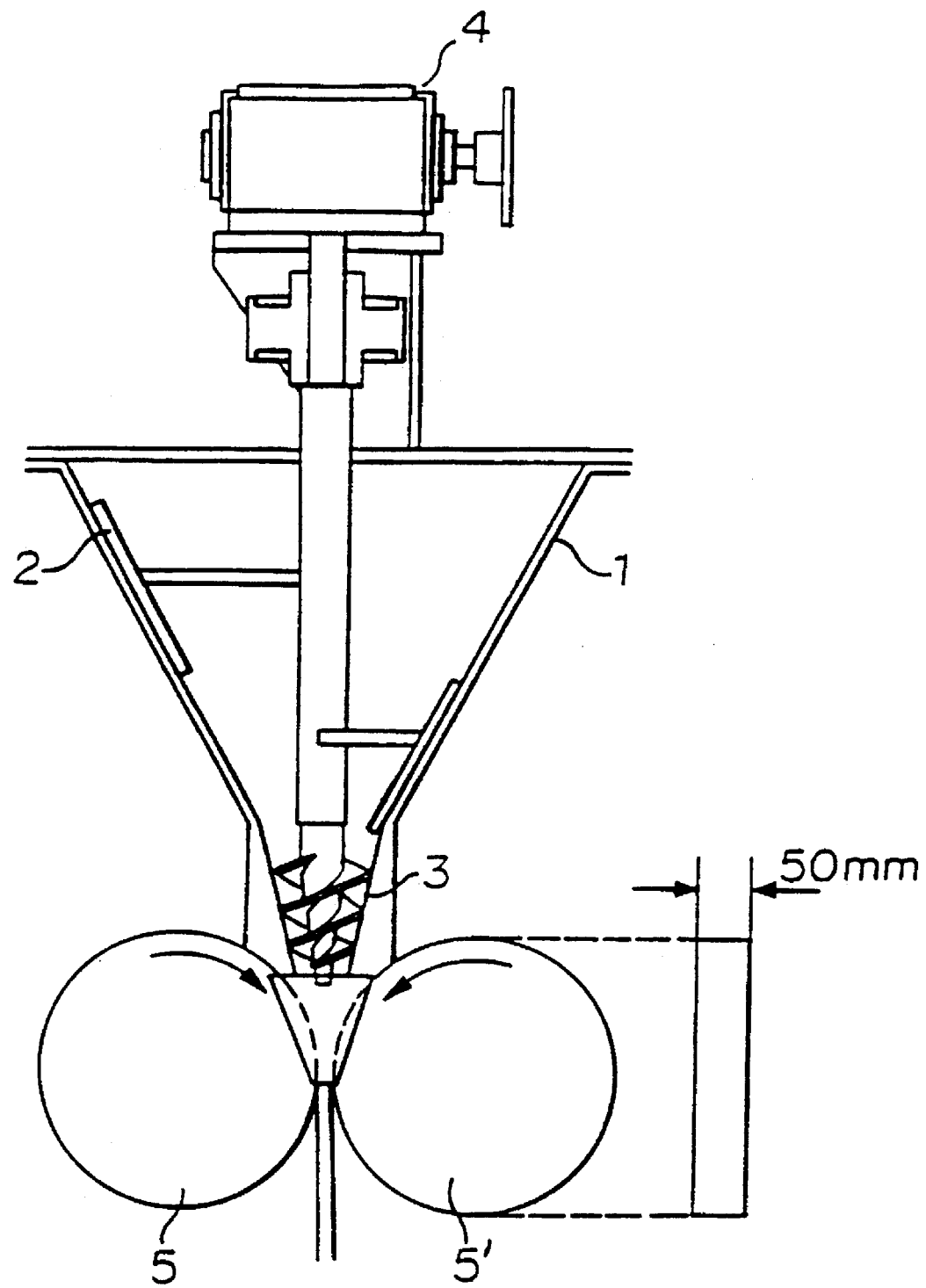

The present invention provides easily dispersible coloring carbon black obtained by compacting carbon black powder material to have a bulk density of from 0.10 to 0.50 g/cm$^3$ and having an initial dispersion of at most 5.0%.

The present invention also provides a process for preparing an ink, which comprises mixing a pigment and a solvent, wherein the pigment is carbon black obtained by compacting carbon black powder material to have a bulk density of from 0.10 to 0.50 g/cm$^3$ and having an initial dispersion of at most 5.0%.

In the accompanying drawing, FIG. 1 is a vertical cross sectional view of a twin roll compacting machine useful for the preparation of the carbon black of the present invention.

Now, the present invention will be described in further detail with reference to the preferred embodiments.

The carbon black starting material of the present invention is not particularly limited, so long as it is in a powder form. It is usual to employ a powder having a tapping bulk density of from 0.05 to 0.30 g/cm$^3$ such as coloring carbon black, carbon black for rubber or acetylene carbon black.

Here, the tapping bulk density is a bulk density measured in accordance with JIS K-1469. Whereas, the bulk density which will be described in detail hereinafter is a bulk density measured in accordance with JIS K-6221. Further, the hardness of carbon black is a hardness measured in accordance with the method of measuring the hardness of pelletized carbon black according to JIS K-6221.

Carbon black having a surface area by nitrogen absorption of from 25 to 200 m$^2$/g is preferable, because if the surface area is too high, the flowability of carbon black tends to be too low, and if it is too low, it impairs the blackness of carbon black.

It is preferable to use carbon black with a DBP absorption of from 40 to 120 ml/100 g, because if the DBP absorption is too high, the flowability of carbon black will be impaired.

The apparatus for compacting the carbon black powder material may be a conventional pelletizer of the type whereby the carbon black powder material is filled in a cylinder, followed by compression by a piston, or a rotary molding machine of the type whereby the carbon black powder material is compressed while being in contact with a rotor. Specific examples of such pelletizer include a single pelletizing machine, a rotary pelletizer, a multiple pelletizer and an inclined roll pelletizer. Specific examples of the rotary molding machine include an upper roller compression turntable molding machine and a roll molding machine. The load for compacting the carbon black powder material is selected taking into consideration the bulk density and the particle size of the material so that the bulk density after compacting will be from 0.10 to 0.50 g/cm$^3$, preferably from 0.15 to 0.45 g/cm$^3$, and the hardness of the compacted carbon black will be at most 1.0 g, preferably from 0.1 to 1.0 g, more preferably from 0.1 to 0.5 g. The load is usually at most 10 kg/cm$^2$, preferably at most 5 kg/cm$^2$. If the load is too much, the resulting carbon black will be hard, and the initial dispersion tends to be poor, such being undesirable. At the time of compacting, additives including a binder such as an oil for ink may suitably be employed.

Now, the present invention will be described in further detail with reference to the drawing.

FIG. 1 shows a vertical cross sectional view of a twin roll compacting machine as an example useful for the present invention. Reference numeral 1 indicates a hopper for the starting material, numeral 2 indicates a stirring vane, numeral 3 indicates a feeding screw, numeral 4 indicates an apparatus for driving the stirring vane 2 and the feeding screw 3, and numerals 5 and 5' indicate press rolls for compacting.

Carbon black powder material in the hopper 1 is fed to the feeding screw 3 while being agitated by the stirring vane 2 to prevent arching (bridging). Carbon black discharged from the feeding screw 3 is compacted between the press rolls 5 and 5' (having a diameter of 250 mm and a roll width of 50 mm). The press rolls 5 and 5' are provided so that the roll pressure, the rotational speeds and the roll slit i.e. the space between the press rolls 5 and 5', can be adjusted.

The press rolls 5 and 5' may be of a calender type as shown in FIG. 1, or may be engraved rolls. Further, the press rolls 5 and 5' may have their surface made of a filter material such as a sintered metal or ceramics and the inside of the press rolls 5 and 5' may be evacuated to have reduced pressure.

The initial dispersion of the present invention represents the dispersibility at the initial stage when carbon black is dispersed by a disper in a medium. Namely, the compacted carbon black is dispersed under a prescribed condition to obtain a slurry, which is then filtered through a screen having a predetermined mesh size. The initial dispersion is the proportion of the carbon black remaining on the screen relative to the amount of the carbon black initially added. The medium, the dispersion condition, the mesh size of the screen, etc. will be set depending upon the particular use of the carbon black. With the compacted carbon black of the present invention, the initial dispersion is at most 5%.

Now, the present invention will be described in further detail with reference to Examples. However, it should be understood that the present invention is by no means restricted to such specific Examples.

TEST METHODS (1) Bulk density

The bulk density was measured in accordance with the method for measuring an apparent specific gravity of pelletized carbon black according to JIS K-6221 and represented by a unit of g/cm$^3$.

(2) Tapping bulk density

The tapping bulk density was measured in accordance with the method for measuring a bulk density according to JIS K-1469 and represented by a unit of g/cm$^3$.

(3) Hardness of compacted pellets

The hardness was measured in accordance with the method for measuring the hardness of pelletized carbon black according to JIS K-6221 and represented by a unit of gram.

(4) Initial dispersion 41.7 Parts by weight of carbon black was added to 100 parts by weight of a vehicle for newspaper ink and dispersed at a rotational speed of 2,000 rpm at 110° C. for 30 minutes by means of a dispersing machine of disperse type. To 100 parts by weight of this dispersed ink, 36.8 parts by weight of diluting oil was added for dilution. A predetermined amount by weight (A g) of this diluted dispersed ink was filtered through a screen of 350 mesh (mesh opening: 44 µm). Diluting oil remained in the carbon black was washed away with acetone. The residue remaining on the screen was dried at 150° C. for 30 minutes and weighed (B g). The initial dispersion was calculated by the following equation.

$$\text{Initial dispersion (\%)} = \frac{B}{A \times C} \times 10000$$

where C is the concentration (% by weight) of the carbon black in the diluted dispersed ink.

EXAMPLE 1

Carbon black for ink (#33, manufactured by Mitsubishi Kasei Corporation tapping bulk density: 0.227 g/cm$^3$, bulk density: 0.185 g/cm$^3$) was compacted under the following conditions by means of a twin roll compacting apparatus (C-102 Compacting Machine, manufactured by Otsuka Tekko K.K.):

| | |
|---|---|
| Amount of carbon black fed: | 10 kg/hr |
| Rotational speed of rolls: | 2.75 rpm |
| Roll pressure: | 18 tons |

The compacted carbon black was tested, and the results are shown in Table 2.

EXAMPLES 2 to 5

The operation was conducted in the same manner as in Example 1 except that the compacting conditions were as identified in Table 1.

COMPARATIVE EXAMPLE 1

By using the same carbon black for ink as used in Example 1 as the starting material, pelletizing was conducted under the following conditions by means of a dry pelletizer:

| | |
|---|---|
| Carbon black: | 100 parts by weight |
| Binder: | Nil |
| Rotational speed of the drum: | 7 rpm |

The pellets thus obtained were subjected to the same tests as in Example 1. The results are shown in Table 2.

COMPARATIVE EXAMPLE 2

By using the same carbon black for ink as used in Example 1 as the starting material, pelletizing was conducted under the following conditions by means of a wet beading machine:

| | |
|---|---|
| Carbon black: | 100 parts by weight |
| Binder: | 100 parts by weight |
| Rotational speed of the drum: | 450 rpm |

The pellets thus obtained were subjected to the same tests as in Example 1. The results are shown in Table 2.

REFERENCE EXAMPLE 1

The initial dispersion of the carbon black powder material used as the starting material in the Examples, was measured and found to be 1.03%.

TABLE 1

| | Example 2 | Example 3 | Example 4 | Example 5 |
|---|---|---|---|---|
| Feeding rate (kg/hr) | 10 | 10 | 10 | 10 |
| Rotational speed of rolls (rpm) | 2.75 | 2.75 | 2.75 | 3.5 |
| Roll pressure (tons) | 11.2 | 5.4 | 0 | 0 |

TABLE 2

|  | Example 1 | Example 2 | Example 3 | Example 4 | Example 5 | Comparative Example 1 | Comparative Example 2 |
| --- | --- | --- | --- | --- | --- | --- | --- |
| Bulk density (g/cm$^3$) | 0.33 | 0.33 | 0.32 | 0.31 | 0.27 | 0.41 | 0.44 |
| Tapping bulk density (g/cm$^3$) | 0.46 | 0.45 | 0.44 | 0.44 | 0.39 | 0.43 | 0.48 |
| Hardness of pellets | 0.3 | 0.3 | 0.2 | 0.1 | 0.1 | 6.2 | 9.4 |
| Initial dispersion (%) | 2.62 | 2.45 | 2.00 | 0.97 | 1.15 | 4.84 | 8.60 |

It is evident from Table 2 that the carbon black of the present invention has excellent dispersibility despite the tapping bulk density is substantially the same as the one obtained by the dry or wet pelletizing.

According to the present invention, novel carbon black free from dusting and yet having excellent dispersibility can be obtained by a simple apparatus of a small size. Further, by using such carbon black, the process for the preparation of an ink can be improved in that the time for dispersing can be shortened, the dirty and dusty operation can be reduced, the carbon black feeding operation can be shortened, and the capacity for storage can be reduced.

I claim:

1. A process for preparing an ink, which comprises mixing a pigment and a solvent, wherein the pigment is flake-like carbon black obtained by compacting carbon black powder material to have a bulk density of from 0.1 to 0.50 g/cm$^3$ and having an initial dispersion in said solvent of at most 5.0%, whereby a reduced amount of time is required for dispersing said carbon black into said solvent, and whereby dirty, dusty and scattering operations are reduced.

2. The process according to claim 1, wherein said carbon black has a DBP absorption of from 40 to 120 ml/100 g and a surface area by nitrogen absorption of from 25 to 200 m$^2$/g.

3. The process according to claim 1, wherein the carbon black is in the form of compacted flake pellets having a hardness of at most 1.0 g.

4. The process according to claim 2, wherein the carbon black is in the form of compacted flake pellets having a hardness of at most 1.0 g.

5. The process according to claim 1, wherein the carbon black powder used for compacting has a tapping bulk density of from 0.05 to 0.30 g/cm$^3$.

6. The process according to claim 5, wherein said carbon black powder is selected from the group consisting of coloring carbon black, carbon black for rubber and acetylene carbon black.

7. The process according to claim 1, wherein said carbon black powder is compacted to have a bulk density of from 0.15 to 0.45 g/cm$^3$.

8. The process according to claim 3, wherein said compacted flake pellets have a hardness of from 0.1 to 0.5 g.

9. The process according to claim 1, wherein said carbon black powder is compacted under a load of at most 10 kg/cm$^2$.

* * * * *